(No Model.)

W. S. WEST.
CLEVIS.

No. 541,517. Patented June 25, 1895.

WITNESSES:

INVENTOR
William S. West.
BY
ATTORNEYS

UNITED STATES PATENT OFFICE.

WILLIAM SMITH WEST, OF CARROLLTON, GEORGIA.

CLEVIS.

SPECIFICATION forming part of Letters Patent No. 541,517, dated June 25, 1895.

Application filed April 6, 1895. Serial No. 544,798. (No model.)

*To all whom it may concern:*

Be it known that I, WILLIAM SMITH WEST, of Carrollton, in the county of Carroll, State of Georgia, have invented an Improved Clevis, of which the following is a specification.

This invention is an improved clevis for plows, cultivators, and the like, the object being to make a clevis which will swing from side to side of the central line of beam, and thus facilitate the rounding of curves, and also permit the plow to run close to a fence or other fixed object.

With these objects in view, my invention consists essentially of a swinging clevis frame, pivoted upon the under side of beam, at a point above the point, and extending forwardly beyond the forward end of beam, and a guard frame or member, connecting to the clevis frame, extending above the beam, and adapted to limit the lateral movement of said frame.

My invention consists also in certain details of construction, and combination of parts, all of which will be fully described and then pointed out in the claims.

Figure 1:
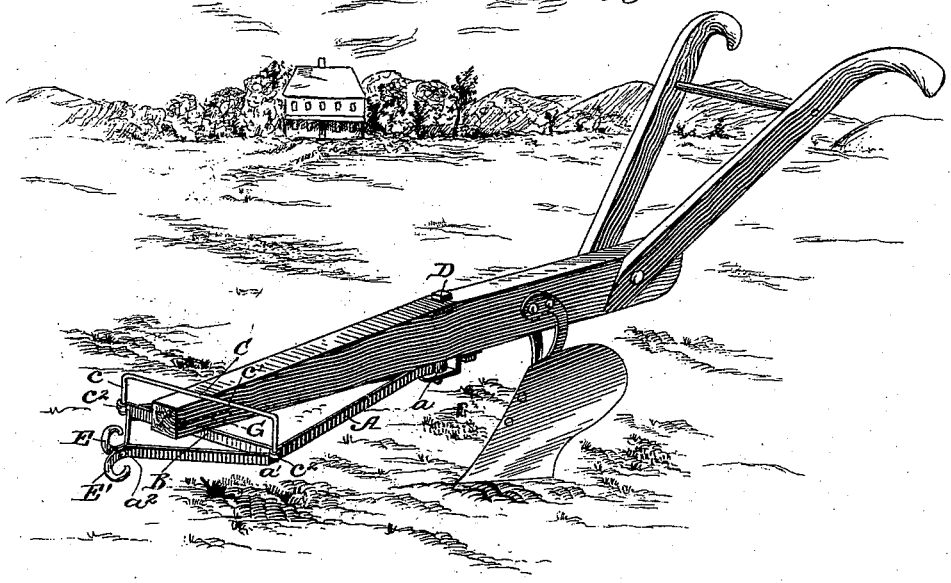
Figure 2:
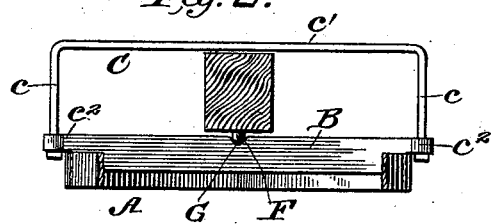
Figure 3:
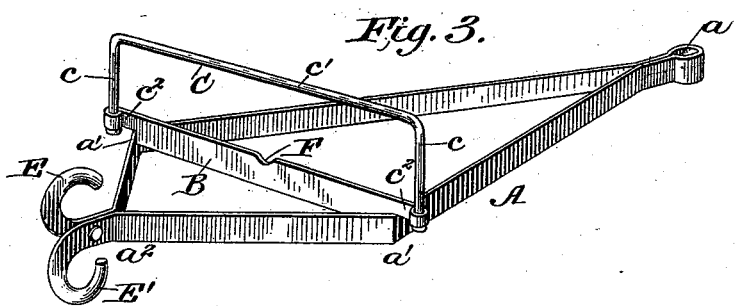

In the drawings forming a part of this specification, Figure 1 is a perspective view of a plow provided with my improved clevis. Fig. 2 is a transverse vertical section, and Fig. 3 a detail view of the clevis-frame.

My invention being applicable to all classes of plows and cultivators, employing a main beam, I have shown plan having the usual beam, standard, point, and handles.

My improved clevis comprises a clevis frame A, quadrilateral in shape, a cross bar B, for holding the frame, in shape, and a guard frame or bar C, for limiting the movement of the said frame.

The frame A is preferably made of light flat bar iron and of a single piece bent upon itself at the center to provide the loop $a$, through which passes the bolt D, by means of which the frame is pivoted to the under side of the beam.

The members of the frame diverge until they reach the point $a'$, when they are made to converge until they contact at $a^2$, where they are securely riveted together, and beyond the point of attachment, one member is bent up to provide a hook E, while the other member is bent down to provide a hook E', said hook being adapted to receive the draft hook or chain, and by using one or the other, the line of draft can be raised or lowered as desired.

The cross bar B is connected with the frame A, at the point $a'$, and holds the members in their proper position. The ends of said cross bar project beyond the sides of frame as shown at $c$, connected with the said ends. On the ends of the guard frame C, said frame comprising the vertical or side member $c$, and the horizontal top member $c'$, the guard members and cross bar, provide a rectangular frame, in which works the end of beam, as the frame is swinging from side to side.

A notch F is produced in the top of cross bar B, at the center of same, and upon the bottom of beam is arranged a metallic rib G, which engages the notch in cross bar, and this centers the frame when the draft is in a line coincident with the center of beam. This notch and rib, however, do not prevent the frame swinging to the side whenever the line of draft changes.

By means of my improved clevis, the horse in rounding a curve will cause the frame to swing to one side, but the point of plow will continue straight for a short distance, and will then round said curve without any effort of the plowman.

With my improved clevis attached, young plants can be cultivated with more ease and better results, and I am also enabled to plow close to a fence, barn, or other object, the draft being applied directly above the point, renders the operation easier for both horse and man.

Having thus described my invention, what I claim, and desire to secure by Letters Patent, is—

1. The combination with a beam, carrying a point or moldboard, of a clevis frame pivoted upon the under side of the beam at a point approximately above the plow point or moldboard, and extending forwardly beyond the forward end of beam, and a guard frame or member connected with the clevis frame about midway its length and extending above the beam and adapted to limit the lateral movement of the clevis frame, whereby the plow is permitted to travel to the end of a furrow, close to a fixed object and facilitated in rounding curves, substantially as set forth.

2. The combination with a beam, of a swinging clevis, frame, pivoted upon the under side of same, said frame, the cross bar having a notch, the rib upon the underside of beam, and the guard bar or frame, arranged above the beam and connected with the clevis frame, substantially as shown and described.

In testimony whereof I affix my signature in the presence of two witnesses.

WILLIAM SMITH WEST.

Witnesses:
I. G. HENRY,
T. E. IDSON.